(12) United States Patent
Kaplan et al.

(10) Patent No.: US 10,882,946 B2
(45) Date of Patent: Jan. 5, 2021

(54) POLYESTER-EPOXIDE POLYMER COMPOSITIONS

(71) Applicant: STEPAN COMPANY, Northfield, IL (US)

(72) Inventors: Warren A. Kaplan, Libertyville, IL (US); Jennifer S. Westfall, Park Ridge, IL (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 16/327,086

(22) PCT Filed: Aug. 8, 2017

(86) PCT No.: PCT/US2017/045860
§ 371 (c)(1),
(2) Date: Feb. 21, 2019

(87) PCT Pub. No.: WO2018/038908
PCT Pub. Date: Mar. 1, 2018

(65) Prior Publication Data
US 2019/0225742 A1 Jul. 25, 2019

Related U.S. Application Data

(60) Provisional application No. 62/379,456, filed on Aug. 25, 2016.

(51) Int. Cl.
| | | |
|---|---|---|
| *C08G 59/42* | (2006.01) | |
| *C09J 167/02* | (2006.01) | |
| *C08G 63/91* | (2006.01) | |
| *C08G 59/62* | (2006.01) | |
| *C08G 59/06* | (2006.01) | |
| *C08G 59/72* | (2006.01) | |
| *C08G 63/20* | (2006.01) | |

(52) U.S. Cl.
CPC ....... *C08G 59/4276* (2013.01); *C08G 59/063* (2013.01); *C08G 59/62* (2013.01); *C08G 59/72* (2013.01); *C08G 63/20* (2013.01); *C08G 63/916* (2013.01); *C09J 167/02* (2013.01)

(58) Field of Classification Search
CPC ...... C08G 59/063; C08G 59/62; C08G 59/72; C08G 63/20; C08G 63/916; C08G 59/4276; C09J 167/02
USPC .......................................................... 525/438
See application file for complete search history.

(56) References Cited

U.S. PATENT DOCUMENTS

| | | |
|---|---|---|
| 3,404,018 A | 10/1968 | Hicks |
| 3,621,074 A | 11/1971 | Siggel et al. |
| 9,169,418 B2 | 10/2015 | Sakane |
| 2004/0072963 A1 | 4/2004 | Sakane et al. |
| 2010/0041794 A1 | 2/2010 | Earls et al. |
| 2010/0126664 A1 | 5/2010 | O'Brien |
| 2011/0288204 A1 | 11/2011 | Grablowitz et al. |
| 2016/0130393 A1 | 5/2016 | Liao et al. |

FOREIGN PATENT DOCUMENTS

| | | |
|---|---|---|
| CN | 101358122 A | 2/2009 |
| CN | 104212405 A | 12/2014 |
| CN | 104745138 A | 7/2015 |
| EP | 1512705 A1 | 3/2005 |
| EP | 2325221 A1 | 5/2011 |
| JP | H0148928 B2 | 10/1989 |
| JP | H0364529 B2 | 10/1991 |
| JP | H05320556 A | 12/1993 |
| KR | 100726684 B1 | 6/2007 |
| RU | 2457220 C1 | 7/2012 |
| WO | 2014072515 A1 | 5/2014 |
| WO | 2015160468 A1 | 10/2015 |
| WO | 2016105722 A1 | 6/2016 |

OTHER PUBLICATIONS

PCT International Search Report and Written Opinion of the International Searching Authority dated Oct. 20, 2017 in corresponding Application No. PCT/US2017/045865, 9 pages.
PCT International Search Report and Written Opinion of the International Searching Authority dated Nov. 23, 2017 in corresponding Application No. PCT/US2017/045867, 8 pages.
PCT International Search Report and Written Opinion dated Oct. 23, 2017 in corresponding Application No. PCT/US2017/045860, 12 pages.
PCT International Preliminary Report on Patentability dated Mar. 7, 2019 in corresponding Application No. PCT/US2017/045860, 7 pages.
Akkapeddi et al., Polym. Prepr. (Am. Chem. Soc., Div. Polym. Chem.) 29 (1988) 567.
Anzures, RadTech Eur. 95 Conf. Proc. 574, 1995.
Arnebold et al., J. Appl. Polym. Sci. 133 (2016) 43986.
Blank et al., J. Coat. Technol. 74 (2002) 33.
Crivello et al., J. Radiat. Curing (Oct. 1986), 3.
Eaton, Paint Coat. Ind. (Jun. 1999), 76.
Haralabakopoulous et al., Polym. Prepr. (Am. Chem. Soc., Div. Polym. Chem.) 38 (1997) 168.

(Continued)

*Primary Examiner* — David T Karst
(74) *Attorney, Agent, or Firm* — Dilworth IP

(57) ABSTRACT

Polyester-epoxide polymer (PEEP) compositions are disclosed. The PEEP compositions comprise a reaction product of a polyepoxide compound (eq. wt. 125 to 250 g/eq.) and a polyester polyol composition. The ratio of epoxy equivalents to hydroxyl equivalents is within the range of 0.8 to 3.5. The PEEP composition has a $T_g$ within the range of −40° C. to 60° C. Elevated temperature-cure and low temperature-cure processes for making the PEEP compositions are also disclosed. In a simple yet innovative approach, a new class of polymers useful for adhesives, coatings, elastomers, and other valuable products is assembled from readily available starting materials without reliance on polyisocyanates or polyamines. The PEEP compositions have increased elongation and lower $T_g$ when compared with traditional epoxy products.

30 Claims, No Drawings

(56) References Cited

OTHER PUBLICATIONS

Harani et al., J. Appl. Polym. Sci. 71 (1999) 29.
Raj et al., Int. J. Plast. Technol. 9 (2005) 451.
Ratna et al., Polym. Eng. Sci. 41 (2001) 1815.
Shalati et al., Prog. Org. Coat. 48 (2003) 236.
Shecter et al., Ind. Eng. Chem. 48 (1956) 86.
Spyrou, Prog. Org. Coat. 43 (2001) 25.
Tomuta et al., Prog. Org. Coat. 76 (2013) 1616.
Worzakowska, J. Appl. Polym. Sci. 110 (2008) 3582.
Wu et al., Polymer 39 (1999) 5747.
Xu et al., Polym. Adv. Technol. 15 (2004) 639.

POLYESTER-EPOXIDE POLYMER COMPOSITIONS

FIELD OF THE INVENTION

The invention relates to polyester-epoxide polymer (PEEP) compositions and their use in polyurethane applications.

BACKGROUND OF THE INVENTION

Epoxy-functional compositions have long been known as building blocks for making epoxy resins. Reaction products of bisphenols and epichlorohydrin, for instance, are mainstays of the epoxy resin industry and have been sold for years as EPON® resins (Hexion Specialty Chemicals). Epoxy resins react with "hardeners" or other crosslinkers—usually polyamines, polycarboxylic acids, or polythiols—to give cured, high polymers for adhesives and other end-use applications.

Epoxy resins are also commonly reacted with acrylic or methacrylic acids to produce "vinyl ester" resins. Vinyl esters have hydroxyl and acrylic functionality and are viewed as a "high end" variety of unsaturated polyester resin. Like unsaturated polyester resins, vinyl ester resins cure with styrene and a free-radical initiator, but they can give plastics with properties that cannot be easily achieved with general-purpose unsaturated polyester resins.

Hydroxy-terminated polyester polyols occupy yet another distinct realm. These are aliphatic or aromatic intermediates that react with polyisocyanates to give polyurethanes. Aromatic polyester polyols are often used to make rigid polyurethane foams for building products, while aliphatic polyester polyols are more commonly found in polyurethane coatings or elastomer applications, such as shoe soles.

Although hydroxy-functional materials can at least in theory be used to cure epoxy resins, conventional practice suggests that polyamines, which will react much more quickly with the epoxide groups, are better suited for this purpose. Among polyesters that have been reacted with epoxy resins, most are terminated with carboxylic acid groups.

Consequently, despite the long-standing availability of epoxy resins and hydroxy-terminated polyester polyols, relatively little has been reported about the possible benefits of these reaction products. In general, when polyester polyols have been reacted with epoxy resins, the polyols have exceptionally high hydroxyl functionality (>4) or hydroxyl number (>500 mg KOH/g), as in the case of dendrimeric or hyper-branched polyester polyols. In other variations, the molar ratio of epoxide reactive groups to hydroxyl reactive groups exceeds about 4:1.

A challenge with most epoxy-based products is in making products having desirable flexibility at low cost while preserving other important properties. Most epoxy-based products have relatively high glass-transition temperatures ($T_g$>80° C.) and low ultimate elongations (<10%).

The industry would benefit from the availability of epoxy-based products having increased elongation, lower $T_g$ values, and a favorable overall balance of properties in adhesives, coatings, elastomers, and other similar products. Desirably, the products could be made using commercially available or readily made starting materials, conventional equipment, and ordinary process conditions. Ideally, epoxy products with excellent physical and mechanical properties could be realized without using polyisocyanates, which are expensive and require special handling, and without using polyamine curatives, which pose environmental and other challenges.

SUMMARY OF THE INVENTION

In one aspect, the invention relates to a polyester-epoxide polymer (PEEP) composition. The PEEP composition comprises a reaction product of a polyepoxide compound and a polyol composition. The polyepoxide compound has an equivalent weight within the range of 125 to 250 g/eq. The polyol composition comprises a polyester polyol having a hydroxyl value within the range of 50 to 400 mg KOH/g, an average hydroxyl functionality within the range of 1.5 to 4.0, and an acid number less than 5 mg KOH/g. The ratio of epoxy equivalents of the polyepoxide compound to hydroxyl equivalents of the polyol composition is within the range of 0.8 to 3.5. The PEEP composition has a glass-transition temperature as measured by differential scanning calorimetry within the range of −40° C. to 60° C.

The invention includes processes for making the PEEP compositions described above. One such process comprises heating, at a temperature within the range of 50° C. to 100° C., a mixture comprising the polyepoxide compound and the polyol composition comprising a polyester polyol as described above. The ratio of epoxy equivalents of the polyepoxide compound to hydroxyl equivalents of the polyol composition is within the range of 0.8 to 3.5, and the PEEP composition has a $T_g$ within the range of −40° C. to 60° C.

Another process for making the PEEP compositions comprises reacting, in the presence of a catalyst comprising a base or a Lewis acid compound, preferably at a temperature within the range of 0° C. to 45° C., the polyepoxide compound and the polyol composition comprising a polyester polyol. Again, the ratio of epoxy equivalents of the polyepoxide compound to hydroxyl equivalents of the polyol composition is within the range of 0.8 to 3.5, and the resulting PEEP composition has a $T_g$ within the range of −40° C. to 60° C.

We found that well-known building blocks drawn from different polymer technologies (urethane, epoxy, UPR) can be assembled to give a new class of polymers ("PEEP" or "polyester-epoxide polymers") that are useful for adhesives, coatings, elastomers, sealants, and other valuable products. Surprisingly, these PEEP products fulfill industry needs without relying on polyisocyanates, which are required polyurethane reactants, or polyamines, which are the most widely used epoxide hardeners. PEEP compositions retain many of the benefits of traditional epoxide polymer products, but they have increased elongation and enhanced flexibility. Excellent products can be made from commercially available or easily synthesized materials; there is no need to resort to specialty polyols such as dendrimers, use high epoxy to hydroxyl ratios, or rely on other esoteric means to achieve good results. Overall, the invention creates a new class of polymers and invites formulators to further explore this simple yet innovative approach to synthesizing thermoset polymers.

DETAILED DESCRIPTION OF THE INVENTION

In one aspect, the invention relates to a polyester-epoxide polymer (PEEP) composition that comprises a reaction product of a polyepoxide compound and a polyol composition comprising a polyester polyol.

The Polyepoxide Compound

Suitable polyepoxide compounds have two or more epoxide groups per molecule and an equivalent weight within the range of 125 to 250 g/eq., or in some aspects 150 to 240 g/eq. or 190 to 235 g/eq.

In preferred aspects, the polyepoxide compounds have an average of 2 to 4 epoxide groups per molecule ("average epoxide functionality"). In some aspects, the average epoxide functionality is from 2 to 3, 2.0 to 2.8, or about 2.

Some suitable polyepoxide compounds are commercially available, while others are readily synthesized from the reaction of epichlorohydrin and a suitable polyol or polyamine precursor, preferably from epichlorohydrin and an aromatic or cycloaliphatic polyol or polyamine.

In some aspects, the polyepoxide compound is a reaction product of a bisphenol (e.g., bisphenol A, bisphenol AP, bisphenol BP, bisphenol C, bisphenol F, bisphenol S, bisphenol Z, or the like) and epichlorohydrin. In other aspects, the polyepoxide compound is the reaction product of a hydrogenated bisphenol and epichlorohydrin. In other words, in some cases the polyepoxide compound is a "diglycidyl ether" of the bisphenol or hydrogenated bisphenol. Many of these materials are commercially available. For instance, suitable polyepoxide compounds include the EPON® 800 series of epoxy resins (products of Hexion Specialty Chemicals), mostly from bisphenol A or bisphenol F, such as EPON® resins 825, 826, 828, 830, 834, 862, and the like. Suitable bisphenol F-based resins also include EPALLOY® 8220, EPALLOY® 8230, and EPALLOY® 8240, products of CVC Thermoset Specialties.

Suitable epoxide compounds include bisphenol diglycidyl ethers in which the aromatic rings have been hydrogenated, such as EPALLOY® 5000 and EPALLOY® 5001, or modified with alkyl or functional groups, such as EPALLOY® 7200. Suitable polyepoxide compounds include di-, tri-, or tetrafunctional aromatic polyepoxides such as resorcinol diglycidyl ether (available as ERISYS™ RDGE from CVC Thermoset Specialties), the triglycidyl ether of tris(hydroxyphenyl)ethane (available, for instance, as EPALLOY® 9000), and the tetraglycidyl ether of m-xylenediamine (available as ERISYS™ GA 240). Suitable polyepoxide compounds also include aromatic and cycloaliphatic glycidyl esters, such as the diglycidyl ester of isophthalic acid, phthalic acid, or terephthalic acid and hydrogenated versions thereof, such as hexahydrophthalic acid diglycidyl ester (available, for instance, as EPALLOY® 5200).

In some aspects, the polyepoxide compound is an aliphatic diglycidyl ether, particularly aliphatic diglycidyl ethers having average epoxide functionalities of at least 2, preferably at least 3. Suitable aliphatic diglycidyl ethers include, for example, 1,4-butanediol diglycidyl ether, 1,4-cyclohexanediol diglycidyl ether, neopentyl glycol diglycidyl ether, ethylene glycol diglycidyl ether, 2-methyl-1,3-propanediol diglycidyl ether, 1,6-hexanediol diglycidyl ether, dipropylene glycol diglycidyl ether, glycerol triglycidyl ether, trimethylolpropane triglycidyl ether, pentaerythritol tetraglycidyl ether, and the like, and mixtures thereof. Suitable polyepoxide compounds of this type are easily made by reacting the polyols with excess epichlorohydrin; many are commercially available from CVC Thermoset Specialties under the ERISYS™ mark or from other suppliers.

Mixtures of various types of polyepoxide compounds can be used. In preferred aspects, the polyepoxide compound comprises at least 50 wt. %, at least 60 wt. %, or at least 75 wt. %, of an aromatic polyepoxide compound, a cycloaliphatic polyepoxide compound, or a combination thereof.

The polyepoxide compound is used in an amount such that the ratio of epoxy equivalents of the polyepoxide compound to hydroxyl equivalents of the polyol composition comprising a polyester polyol (also described herein as the "epoxy/OH eq. ratio") is within the range of 0.8 to 3.5. In other aspects, the ratio of epoxy to hydroxyl equivalents will range from 0.9 to 3.2, from 1.0 to 3.0, or from 1.5 to 3.0. The "epoxy/OH index" or "epoxy/hydroxyl index" referred to herein is the epoxy/OH eq. ratio multiplied by 100.

The amount of polyepoxide compound used can vary and will depend on many factors, including the nature of the polyepoxide compound, the nature of the polyol composition, the desired stoichiometry, and other factors. In general, however, the amount of polyepoxide compound will be within the range of 20 to 80 wt. %, 30 to 70 wt. %, or 35 to 65 wt. %, based on the amount of PEEP composition.

The Polyol Composition

The polyester-epoxide polymer composition comprises a reaction product of the polyepoxide compound described above and a polyol composition. The polyol composition comprises a polyester polyol.

Suitable polyester polyols are well known and include aromatic and aliphatic polyester polyols. These polyols are terminated with hydroxyl groups and generally have low acid numbers (i.e., below 5 mg KOH/g). Suitable polyester polyols are readily synthesized by condensation polymerization of dicarboxylic acids, esters, or anhydrides with low molecular weight diols, polyols, or their mixtures. Suitable dicarboxylic acids, esters, or anhydrides include, for example, phthalic anhydride, isophthalic acid, terephthalic acid, dimethyl terephthalate, trimellitic anhydride, maleic anhydride, succinic anhydride, succinic acid, dimethyl succinate, diethyl adipate, glutaric acid, adipic acid, sebacic acid, suberic acid, and the like, and combinations thereof. Suitable diols and polyols useful for making polyester polyols include, for example, ethylene glycol, propylene glycol, 2-methyl-1,3-propanediol, 1,4-butanediol, 1,6-hexanediol, diethylene glycol, dipropylene glycol, triethylene glycol, tripropylene glycol, neopentyl glycol, 1,4-cyclohexanedimethanol, glycerin, trimethylolpropane, trimethylolethane, pentaerythritol, and the like, and combinations thereof.

Many suitable polyester polyols for use herein are commercially available from Stepan Company and other polyol suppliers. Examples include the STEPANPOL® PS-, PC-, PD-, PH-, PHN-, PN-, and AA-series polyols, products of Stepan. Particular examples include STEPANPOL® PS-2402, STEPANPOL® PS-3021, STEPANPOL® PS-3524, STEPANPOL® PC-1028-210, and STEPANPOL® PC-1028-110 (aromatic polyester polyols) and STEPANPOL® AA-58, STEPANPOL® PC-102-110, STEPANPOL® PC-102-210, STEPANPOL® PC-105-110, STEPANPOL® PC-1040-55, and STEPANPOL® PC-5080-110 (aliphatic polyester polyols). Other commercially available products include TERATE® and TERRIN™ polyols from INVISTA, TEROL® polyols from Huntsman, LUPRAPHEN® polyols from BASF, DESMOPHEN® polyols from Covestro, FOMREZ® polyols from Chemtura, and DIEXTER™ polyols from Coim.

The polyol composition can include polyether polyols, polycarbonate polyols, or other kinds of polyols in addition to the polyester polyol. In general, the polyol composition comprises at least 50%, in some aspects at least 65%, in other aspects at least 80%, of one or more polyester polyols.

In suitable polyol compositions, the polyester polyol will have a hydroxyl value within the range of 50 to 400 mg KOH/g. In some aspects, the polyester polyol will have a hydroxyl value within the range of 60 to 350 mg KOH/g, or within the range of 80 to 150 mg KOH/g.

The polyester polyols will have average hydroxyl functionalities within the range of 1.5 to 4.0. In some aspects, the polyester polyol will have an average hydroxyl functionality within the range of 1.8 to 3.8 or 2.0 to 3.5.

The polyester polyols have mostly hydroxyl end groups, not carboxylic acid end groups, and consequently will have low acid numbers, i.e., less than 5 mg KOH/g. In some aspects, the polyester polyols will have acid numbers less than 3 mg KOH/g, less than 2 mg KOH/g, or less than 1 mg KOH/g.

As indicated earlier, the polyol composition will be used in an amount effective to give a ratio of epoxy equivalents of the polyepoxide compound to hydroxyl equivalents of the polyol composition within the range of 0.8 to 3.5, or 0.9 to 3.2, or 1.0 to 3.0, or 1.5 to 3.0.

The amount of polyol composition used can vary and will depend on many factors, including the nature of the polyepoxide compound, the nature of the polyol composition, the desired stoichiometry, and other factors. In general, however, the amount of polyol composition will be within the range of 20 to 80 wt. %, 30 to 70 wt. %, or 35 to 65 wt. %, based on the amount of PEEP composition.

Polyester-Epoxide Polymer (PEEP) Compositions

The reaction product of the polyepoxide compound and the polyol composition comprising a polyester polyol is a polyester-epoxide polymer, also described herein as a "PEEP" composition. The PEEP compositions are distinguishable from conventional epoxy products in having a unique balance of properties.

For instance, the PEEP compositions will have a relatively low glass-transition temperature ($T_g$), as measured by differential scanning calorimetry (DSC), within the range −40° C. to 60° C. In some aspects, the $T_g$ of the PEEP composition will be within the range of −30° C. to 35° C., or within the range of −20° C. to 30° C., or within the range of −10° C. to 20° C.

When compared with conventional epoxy products, the PEEP compositions have increased ultimate elongations (i.e., "elongation at break," hereinafter simply "elongation"). In some aspects, the PEEP compositions will have elongations (as measured by ASTM D412, Method A) of at least 30%, at least 40%, at least 60%, or at least 80%. In other aspects, the PEEP compositions will have elongations within the range of 30% to 500%, 45% to 300%, or 50% to 200%.

The PEEP compositions can include additives such as surfactants, fillers, pigments, flame retardants, catalysts, viscosity modifiers, blowing agents, reactive diluents, and the like. The type and amount of additive used will depend on the requirements of the specific end-use application.

The PEEP compositions can be formulated as elastomers, microcellular elastomers, coatings, sealants, adhesives, and other products. Elastomers can be formulated to give a wide range of Shore A or Shore D hardness values. In general, the PEEP compositions will have lower hardness values compared with conventional epoxy systems. Typical hardness values will range from Shore A 40 to Shore A 96, more typically Shore A 70 to Shore A 90.

Elastomeric PEEP compositions normally have increased total energy absorption ("T.E.A.") values as determined hereinbelow when compared with those of conventional epoxy systems. The T.E.A. values will typically range from 10 to 500 lb·in./in.$^2$, 10 to 300 lb.in./in.$^2$, or 20 to 200 lb.in./in.$^2$.

Coatings from the PEEP compositions can exhibit good cross-hatch adhesion, respectable abrasion resistance, and somewhat improved impact resistance when compared with conventional epoxy systems (see Tables 1 and 3, below).

Adhesives from the PEEP compositions can be formulated to achieve a variety of different lap shear strengths or other desirable properties (see Tables 4-9, below).

Elevated-Temperature Process

In one aspect, the invention relates to an elevated-temperature process for making a polyester-epoxide polymer composition. The process comprises heating, at a temperature within the range of 50° C. to 100° C., a mixture comprising a polyepoxide compound as described above and a polyol composition comprising a polyester polyol as described above. The ratio of epoxy equivalents of the polyepoxide compound to hydroxyl equivalents of the polyol composition is within the range of 0.8 to 3.5. The resulting polyester-epoxide polymer composition has a glass-transition temperature as measured by differential scanning calorimetry within the range of −40° C. to 60° C., or in some aspects, −30° C. to 35° C.

In some aspects, the process is performed in the presence of a catalyst, for instance, a tertiary amine such as 1,4-diazabicyclo[2.2.2]octane, 2,4,6-tris(dimethyl-aminophenyl)phenol, 4-dimethylaminopyridine, N,N-dimethylbenzylamine, (4-dimethyl-aminomethyl)phenol, (2-dimethylaminomethyl)phenol, 2,4,6-tris(4-morpholinylmethyl)-phenol, or the like.

In some aspects the mixture of polyepoxide compound and polyol composition is heated at a temperature within the range of 60° C. to 90° C., or 65° C. to 80° C.

In some aspects, the polyol composition used to make the PEEP coating composition comprises or consists of an aromatic polyester polyol or an aromatic polyester polyol in combination with an aliphatic polyester polyol. In other aspects, the polyol composition comprises or consists of an aliphatic polyester polyol.

Low-Temperature Process

In a preferred aspect, the PEEP composition is produced at a temperature within the range of 0° C. to 45° C., more preferably under ambient conditions or without added heat. This process comprises reacting, in the presence of a catalyst comprising a base or a Lewis acid compound, the polyepoxide compound and the polyol composition comprising a polyester polyol as described earlier. The ratio of epoxy equivalents of the polyepoxide compound to hydroxyl equivalents of the polyol composition is within the range of 0.8 to 3.5. The resulting polyester-epoxide polymer composition has a glass-transition temperature as measured by differential scanning calorimetry within the range of −40° C. to 60° C., or in some aspects, −30° C. to 35° C.

Some suitable catalysts comprise a Lewis acid compound. Suitable Lewis acid compounds are electron pair acceptors and include, for example, aluminum chloride, aluminum bromide, zinc chloride, boron trichloride, boron trifluoride, tin tetrachloride, antimony pentachloride, and the like. Boron trifluoride and especially complexes of boron trifluoride with electron donors (e.g., ethers, alcohols, carboxylic acids, polyols, amines, sulfides) are preferred Lewis acid compounds. Examples include boron trifluoride etherate, boron trifluoride tetrahydrofuran complexes, boron trifluoride/alcohol complexes, boron trifluoride/acetic acid complexes, boron trifluoride/phosphoric acid complexes, boron trifluoride dimethyl sulfide complexes, boron trifluoride amine complexes, boron trifluoride polyol complexes, and the like, and combinations thereof. Lewis acid complexes with ethers, alcohols, polyols, and amines are particularly preferred. Suitable catalysts include, for instance, LEECURE® B-610 and LEECURE® B-1310, complexes of boron trifluoride with a Lewis base, products of Leepoxy Plastics, Inc.

In other aspects, the low-temperature process is performed in the presence of a base catalyst. Amine catalysts are preferred. In some preferred aspects, the amine catalyst comprises an amine compound, a polyamine, a polyamide, or a mixture thereof. Tertiary amines are preferred amine compounds. Suitable amine catalysts include, for example, 1,4-diazabicyclo[2.2.2]octane, 2,4,6-tris(dimethylaminomethyl)phenol (e.g., "DM P-30"), 4-dimethylaminopyridine, N,N-dimethylbenzylamine, (4-dimethylamino-methyl)phenol, (2-dimethylaminomethyl)phenol, 2,4,6-tris(4-morpholinylmethyl)phenol, 1,3,5-tris(3-(dimethylamino)propyl)hexahydro-s-triazine (e.g., POLYCAT® 41 from Air Products or JEFFCAT® TR-90 from Huntsman), and the like, and mixtures thereof.

The amount of Lewis acid or base catalyst required for good curing will depend on many factors that are within the skilled person's discretion, including the nature of the polyepoxide compound, the nature of the polyol composition, the particular catalyst selected, the kind of product (e.g., coating, adhesive, elastomer), the product dimensions, the desired pot life, the open time, and other factors. Generally, however, the amount of catalyst will be within the range of 0.01 to 10 wt. %, or 0.1 to 8 wt. %, or 1 to 5 wt. % based on the amount of PEEP composition produced.

The low-temperature process is performed at a temperature within the range of 0° C. to 45° C., or 10° C. to 30° C., or in many cases, at room temperature.

In some aspects, the polyol composition used to make the PEEP composition according to the low-temperature process comprises or consists of an aromatic polyester polyol or an aromatic polyester polyol in combination with an aliphatic polyester polyol. In other aspects, the polyol composition comprises or consists of an aliphatic polyester polyol.

In some aspects, the low-temperature process is performed at an epoxy/hydroxyl index within the range of 100 to 350. In other aspects, the polyepoxide compound and the polyol composition are reacted at an epoxy/hydroxyl index within the range of 135 to 330. A high epoxy to hydroxyl index can be helpful for producing coatings, elastomers, sealants, adhesives, and other products having desirable properties.

The following examples merely illustrate the invention; the skilled person will recognize many variations that are within the spirit of the invention and scope of the claims.
Formulation Components:

EPON® 828 (Hexion Specialty Chemicals): a liquid bisphenol A diglycidyl ether-based epoxy resin. Ave. eq. wt.: 189. Viscosity: 13,000 cP at 25° C.

EPON® 826 (Hexion Specialty Chemicals): a liquid bisphenol A diglycidyl ether-based epoxy resin. Ave. eq. wt.: 182. Viscosity: 8,000 cP at 25° C.

EPON® 830 (Hexion Specialty Chemicals): a liquid bisphenol A diglycidyl ether-based epoxy resin. Ave. eq. wt.: 194. Viscosity: 19,750 cP at 25° C.

EPALLOY® 5000 (CVC Thermoset Specialties): epoxidized hydrogenated bisphenol A. Ave. eq. wt.: 220 g/eq.

EPALLOY® 5001 (CVC Thermoset Specialties): accelerated epoxidized hydrogenated bisphenol A. Ave. eq. wt.: 200 g/eq.

EPALLOY® 8240 (CVC Thermoset Specialties): epoxidized phenol novolac resin. Ave. eq. wt.: 170 g/eq.

PolyTHF 1000 (BASF): polytetrahydrofuran diol. OH value: 112 mg KOH/g. Functionality: 2.0.

STEPANPOL® AA-58 (Stepan Company): aliphatic polyester polyol from adipic acid. OH value: 61 mg KOH/g. Functionality: 2.7.

STEPANPOL® PC-102-110 (Stepan Company): aliphatic polyester polyol from 1,4-butanediol and adipic acid. OH value: 110 mg KOH/g. Functionality: 2.0.

STEPANPOL® PC-102-210 (Stepan Company): aliphatic polyester polyol from 1,4-butanediol and adipic acid. OH value: 210 mg KOH/g. Functionality: 2.0.

STEPANPOL® PC-105-110 (Stepan Company): aliphatic polyester polyol from 1,6-hexanediol and adipic acid. OH value: 110 mg KOH/g. Functionality: 2.0.

STEPANPOL® PC-1028-210 (Stepan Company): aromatic polyester polyol from 1,6-hexanediol and phthalic anhydride. OH value: 210 mg KOH/g. Functionality: 2.0.

STEPANPOL® PC-1028-240 (Stepan Company): aromatic polyester polyol from 1,6-hexanediol and phthalic anhydride. OH value: 240 mg KOH/g. Functionality: 2.0.

STEPANPOL® PC-1040-55 (Stepan Company): aliphatic polyester polyol from ethylene glycol, 1,4-butanediol, and adipic acid. OH value: 56 mg KOH/g. Viscosity: 655 cP at 73° C. Functionality: 2.0.

STEPANPOL® PC-5080-110 (Stepan Company): proprietary high-functionality aliphatic polyester polyol. OH value: 110 mg KOH/g.

STEPANPOL® PS-2402 (Stepan Company): aromatic polyester polyol from phthalic anhydride and diethylene glycol. OH value: 234 mg KOH/g. Viscosity: 10,500 cP at 25° C. Functionality: 2.0.

STEPANPOL® PS-3021 (Stepan Company): aromatic polyester polyol from terephthalic acid, phthalic anhydride, diethylene glycol, 2-methyl-1,3-propanediol, glycerin, and soybean oil. OH value: 300 mg KOH/g. Viscosity: 7500 cP at 25° C. Functionality: 2.1.

STEPANPOL® PS-3524 (Stepan Company): aromatic polyester polyol from terephthalic acid, phthalic anhydride, diethylene glycol, glycerin, and soybean oil. OH value: 350 mg KOH/g. Viscosity: 7500 cP at 25° C. Functionality: 2.4.

IPA-DEG polyol: aromatic polyester polyol from isophthalic acid and diethylene glycol. OH value: 236 mg KOH/g. Viscosity: 28,200 cP at 25° C. Functionality: 2.0.

IPA-HDO-115 polyol: aromatic polyester polyol from isophthalic acid and 1,6-hexanediol. OH value: 115 mg KOH/g. Functionality: 2.0.

IPA-HDO-240 polyol: aromatic polyester polyol from isophthalic acid and 1,6-hexanediol. OH value: 240 mg KOH/g. Functionality: 2.0.

IPA-HDO-315 polyol: aromatic polyester polyol from isophthalic acid and 1,6-hexanediol. OH value: 315 mg KOH/g. Functionality: 2.0.

TPA-DEG polyol: aromatic polyester polyol from terephthalic acid and diethylene glycol. OH value: 234 mg KOH/g. Viscosity: 16,600 cP at 25° C. Functionality: 2.0.

LEECURE® B-1310 (Leepoxy Plastics, Inc.): boron trifluoride-based catalyst.

LEECURE® B-610 (Leepoxy Plastics, Inc.): boron trifluoride-based catalyst.
Preparation of IPA-DEG Polyol Isophthalic acid (652.7 g) and diethylene glycol (688.9 g) are charged to a reaction vessel equipped with mechanical stirring, a temperature probe, a nitrogen inlet, and a packed condenser column having a side-arm condenser. The mixture is heated to 220° C. over about 1 h. Distillate is rapidly removed and the mixture becomes clear. After 8 h, the acid value reaches 13 mg KOH/g. After cooling overnight, heating resumes. When the temperature reaches 200° C., tetrabutoxytitanium (0.36 g) is added. The hydroxyl value is 213 mg KOH/g. Diethylene glycol (31 g) is added, and the mixture is heated to 220° C. until the reaction is deemed complete. Final hydroxyl value (corrected): 236 mg KOH/g.
Preparation of TPA-DEG Polyol Terephthalic acid (652.7 g) and diethylene glycol (688.9 g) are charged to a reaction vessel equipped with mechanical stirring, a temperature probe, a nitrogen inlet, and a packed condenser column having a side-arm condenser. The mixture is heated to 220° C. over about 1 h. Distillate is slowly removed and the mixture remains cloudy and white. After cooling overnight, heating resumes to 220° C. for a second and then a third day. At the end of the third day, tetrabutoxytitanium (0.36 g) is added. The hydroxyl value of the clear product is 210 mg KOH/g. Diethylene glycol (37 g) is added, and the mixture is heated to 220° C. until the reaction is deemed complete. Final hydroxyl value (corrected): 234 mg KOH/g.
Preparation of IPA-HDO-240 Polyol Isophthalic acid (1960 g) and 1,6-hexanediol (2465 g) are charged to a reaction vessel equipped with mechanical stirring, a temperature probe, a nitrogen inlet, and a packed condenser column having a side-arm condenser. The mixture is heated to 220° C. over about 1 h. Distillate is slowly removed and the mixture remains cloudy and white. After cooling overnight, heating resumes to 220° C. for a second and then a third day. At the end of the third day, tetrabutoxytitanium (1.17 g) is added. Hydroxyl value: 242 mg KOH/g. Acid value: 0.6 mg KOH/g.
Preparation of IPA-HDO-115 Polyol The procedure used to make IPA-HDO-240 is modified by adjusting the amounts used of isophthalic acid (2354 g) and 1,6-hexanediol (2156 g). Hydroxyl value: 116 mg KOH/g. Acid value: 0.4 mg KOH/g.
Preparation of IPA-HDO-315 Polyol The procedure used to make IPA-HDO-240 is modified by adjusting the amounts used of isophthalic acid (1777 g) and 1,6-hexanediol (2608 g). Hydroxyl value: 318 mg KOH/g. Acid value: 0.4 mg KOH/g.

Examples 1-7

Preparation of Polyester-Epoxide Polymers (PEEP): Elevated-Temperature Process

The PEEP materials described below are prepared by hand-stirring epoxy resin, polyol, and about 3 wt. % of an amine catalyst (100-200 g total) in a small paper cup for 1-2 min at room temperature. The reaction is slow, which allows the mixture to be poured into a mold for an eventual accelerated cure using heat. Properties of cast elastomers and coatings made from these materials appear in Table 1.

Example 1

EPON® 828 (50.0 g, 0.26 eq.) is hand-stirred with STEPANPOL® PS-2402 (62.4 g, 0.26 eq.) and 2,4,6-tris(dimethylaminomethyl)phenol ("DMP-30," 3.0 g) at room temperature in a small paper cup. After a few seconds, the mixture clears. The cup is placed in an oven at 70° C. for 2-3 h to fully cure the polymer.

Example 2

EPON® 828 (50.0 g, 0.26 eq.) is hand-stirred with 1:1 (w/w) blend of STEPANPOL® PC-1040-55 and the IPA-DEG polyol described above (55.5 g, 0.144 eq.) and DMP-30 (3.0 g) at room temperature in a small paper cup. After mixing for 1 minute, the cup is placed in an oven at 70° C. for 2-3 h to fully cure the polymer.

Example 3

EPON® 828 (50.0 g, 0.26 eq.) is hand-stirred with the IPA-DEG polyol described above (61.9 g, 0.26 eq.) and DMP-30 (3.0 g) at room temperature in a small paper cup. After mixing for 1 minute, the cup is placed in an oven at 70° C. for 2-3 h to fully cure the polymer.

Example 4

EPON® 828 (50.0 g, 0.26 eq.) is hand-stirred with the TPA-DEG polyol described above (62.1 g, 0.26 eq.) and DMP-30 (3.0 g) at room temperature in a small paper cup. After mixing for 1 minute, the cup is placed in an oven at 70° C. for 2-3 h to fully cure the polymer.

Example 5

EPON® 830 (50.4 g, 0.26 eq.) is hand-stirred with STEPANPOL® PS-2402 (62.4 g, 0.26 eq.) and DMP-30 (3.0 g) at room temperature in a small paper cup. After mixing for 1 minute, the cup is placed in an oven at 70° C. for 2-3 h to fully cure the polymer.

Example 6

EPON® 826 (47.3 g, 0.26 eq.) is hand-stirred with STEPANPOL® PS-2402 (62.4 g, 0.26 eq.) and DMP-30 (3.0 g) at room temperature in a small paper cup. After mixing for 1 minute, the cup is placed in an oven at 70° C. for 2-3 h to fully cure the polymer.

Example 7

EPON® 828 (50.2 g, 0.26 eq.) is hand-stirred with a 94:6 by weight mixture of STEPANPOL® PS-2402 and 1,4-butanediol (49.8 g of mixture, 0.26 eq.) and DMP-30 catalyst (3.0 g) at room temperature in a small paper cup. After mixing for 1 minute, the cup is placed in an oven at 70° C. for 2-3 h to fully cure the polymer.

Examples 8-14

PEEP Compositions from Aromatic Polyester Polyols: Low-Temperature Process

Example 8

STEPANPOL® PS-3021 polyol (43.2 g) is mixed rapidly at room temperature with EPALLOY® 5000 (50.9 g) and LEECURE® B-1310 catalyst (6.0 g). The mixture is clear after a few seconds. Mixing continues for 30 s. The material hardens after about 0.5 to 2 h to give a cured polymer. Properties of cast elastomers made from this material appear in Table 2.

Examples 9-14

The procedure of Example 8 is generally followed using STEPANPOL® PS-3021 or STEPANPOL® PS-3524, EPALLOY® 5000, and LEECURE® B-1310 catalyst in the gram amounts shown in Table 2. The products harden within 45 min. to 2 h. Properties of cast elastomers and coatings made from these materials appear in Table 2.

Examples 15-21

PEEP Compositions from Blends of Aromatic and Aliphatic Polyester Polyols: Low-Temperature Process Example 15

A 50:50 blend (w/w) of STEPANPOL® PS-3021 (aromatic polyester polyol, 18.4 g) and STEPANPOL® PC-1040-55 (aliphatic polyester polyol, 18.4 g) is prepared. This polyester polyol blend is combined and mixed rapidly at room temperature with EPALLOY® 5000 (55.2 g) and LEECURE® B-1310 catalyst (8.0 g). The epoxide/OH index is 216. The mixture is clear after a few seconds. Mixing continues for 30 s. The material hardens after about 1 h and a considerable amount of heat is generated. Properties of cast elastomers and coatings made from this material appear in Table 3.

Examples 16-21

The procedure of Example 15 is generally followed using the amounts of STEPANPOL® PS-3021, STEPANPOL® PC-1040-55, EPALLOY® 5000, EPALLOY® 5001, and LEECURE® B-1310 catalyst shown in Table 3. Properties of cast elastomers and coatings made from these materials appear in Table 3.

Examples 22-28

PEEP Compositions from Aromatic Polyester Polyols: Low-Temperature Process

The procedure of Example 8 is generally followed using a series of aromatic polyester polyols (OH value: 240 mg KOH/g), LEECURE® B-610 catalyst, and EPALLOY® 8240, or EPON® 828 to produce cast elastomer and adhesive samples. Formulations and test results appear in Table 4.

Examples 29-34

PEEP Compositions from Aliphatic Polyester Polyols: Low-Temperature Process

The procedure of Example 8 is generally followed using aliphatic polyester polyols, LEECURE® B-610 catalyst, and EPALLOY® 8240, EPALLOY® 5000, and/or EPON® 828 to produce cast elastomer, coating, and adhesive samples. Example 34 includes 10 wt. % of an aromatic polyester polyol. Formulations and test results appear in Table 5.

Examples 35-39

PEEP Compositions from Aromatic Polyester Polyols: Low-Temperature Process. Effect of Epoxy/OH Index The procedure of Example 8 is generally followed using STE PANPOL® PC-1028-210 (an aromatic polyester polyol from 1,6-hexanediol and phthalic anhydride), EPON® 828, and LEECURE® B-610 catalyst while varying the epoxy to OH index to produce cast elastomer, coating, and adhesive samples. Formulations and test results appear in Table 6.

Examples 40-47

PEEP Compositions from Low-Temperature Process. $T_g$>0° C.

The procedure of Example 8 is generally followed using aromatic polyester polyols or a blend of aromatic and aliphatic polyester polyols, EPON® 828 or EPALLOY® 8240, and boron trifluoride/polyol catalyst at an epoxy to OH index of 200-300 to produce cast elastomer or adhesive samples. In each case, the glass-transition temperature ($T_g$) of the PEEP composition is greater than 0° C. (1.1° C. to 56° C.). Formulations and test results appear in Table 7.

Examples 48-53

PEEP Compositions from Low-eTmperature Process. $T_g$<0° C.

The procedure of Example 8 is generally followed using aliphatic polyester polyols or a blend of aromatic and aliphatic polyester polyols, EPON® 828 or EPALLOY® 8240, and boron trifluoride/polyol catalyst at an epoxy to OH index of 125 or 300 to produce cast elastomer or adhesive samples. In each case, the $T_g$ of the PEEP composition is less than 0° C. (−3.2° C. to −37° C.). Formulations and test results appear in Table 8.

Examples 54-57

Effect of Curing Conditions on Lap Shear Strength

The procedure of Example 8 is generally followed using aromatic polyester polyols, EPON® 828 or EPALLOY® 8240, and boron trifluoride/polyol catalyst at an epoxy to OH index of 200 or 300 to produce adhesive samples under a variety of different curing and post-cure conditions as shown in Table 9. In each case, the $T_g$ of the PEEP composition is greater than 35° C. (37° C. to 51° C.). Formulations and test results appear in Table 9.

Coating and Elastomer Sample Preparation

In general, the reaction products are either poured into a mold or are drawn down onto a surface to provide elastomer or coating samples, respectively, for testing. Elastomer samples are produced by pouring about 100 g of reaction mixture into 7"×7"×0.1" molds (ambient conditions, coated with mold release) about 90 s after mixing is initiated. The material is allowed to spread for about 30 s and is then covered. Tongue depressors are positioned at the edges of the mold to provide about 0.07" of venting around the perimeter. Dogbone samples (5.5"×0.5") are cut and conditioned at 25° C. and 50% relative humidity for 12 h prior to physical testing. The molded parts or coatings produced using the low-temperature process are allowed to cure for at least 5 days at room temperature prior to testing.

Mechanical Properties

A universal testing machine (MTS ReNew™ system) and TestWorks® 4.11 software are used for sample testing and analysis. The central test portion of the dogbone samples is 0.5" wide and 1.65" long. Samples are placed in grips spaced 2.25" apart. A 1000 lb. load cell is used to measure properties at a tensile pull rate of 2"/min until sample breakage. Tensile strength, modulus, elongation-at-break, and total energy absorbed are measured at least in duplicate and averaged.

Total energy absorbed ("T.E.A.") is calculated by the universal testing machine software (Testworks 4.11) and obtained by normalizing the area under the stress-strain curve by the surface area of the central test portion (tapered portion) of the dogbone sample. The area under the stress-strain curve is calculated from the product of the total force (pounds) required to produce extension of the sample up to breakage (inches). For each sample, the surface area is 0.825 in.$^2$. Total energy absorbed is a measurement that allows for comparison of the relative toughness of each sample tested. The units of T.E.A. are lb·in./in.$^2$.

Hardness

Hardness of cured polymer samples is determined using a Type A durometer (Pacific Transducer, Model 306L) according to ASTM 2240-85. The dogbone samples described earlier are used.

Mechanical properties and hardness measurements are performed at 23° C.±1° C. and 50% relative humidity.

Glass-Transition Temperature

Glass-transition temperatures ($T_g$) are determined using a TA Instruments Discovery Series differential scanning calorimeter and Trios (V3.2) software from TA Instruments. Samples are prepared by trimming a 10-20 mg piece from the dogbone samples used for mechanical property testing. The sample is accurately weighed, crimped in the test pan, and placed in the sample holder of the instrument along with a reference pan. The sample is cooled to −50° C. and then warmed from −50° C. to 150° C. at 5° C. per minute. The polyester-epoxide polymer samples typically exhibit a strong $T_g$ signal with a midpoint within the range of −40° C. to 60° C.

Coatings: Sample Preparation by Elevated-Temperature Process

Samples are prepared by mixing reactants in a paper cup for 1 min. at room temperature. The reacting system is then applied with a pipette as a thin line across the substrate to be coated. Glossy Leneta paper (Form 7B, Leneta Co.) is used for measuring Taber abrasion properties. A #50 drawdown bar (BYK Co.) is used to apply a thin liquid layer on the glossy paper, which is transferred to an oven to cure (2 h, 70° C.). After an additional week of curing at room temperature, the samples are adhered and cut on square mounting cards prior to testing.

Coating Property Testing

Taber abrasion testing is performed in accord with ASTM D 4060 using a 5139 Taber Industries abrader. Separate experiments using the finer Calibrase® CS-17 and the coarser Calibrase® H-18 abrasion test wheels (Taber Industries) are performed for certain samples. The wheels are pressed to the surface with a 1000-g weight. Samples are measured for weight loss after 1000 cycles.

Cross-hatch adhesion tests are performed according to ASTM D 3359 on treated steel. A Gardco® cross-hatch tape test kit (Paul N. Gardner Co.) is used. Adhesion quality is judged based on visual observation of coating damage after the test tape is affixed and then ripped from the coating. A 5B rating indicates no coating damage, while lower numbers indicate progressively greater damage.

Impact strength is determined using a Gardner impact tester (from BYK). Using the 4-lb. projectile, coated steel samples are subjected to varying impact forces based on the height of projectile release. Impact strength (pounds per inch) is the force required to cause visual coating damage. Measurements are performed for direct impact (coated side impact) and indirect impact (impact on the opposite side of the coating).

Adhesive Preparation and Testing

The procedure of ASTM D-1002 is generally followed. Test samples are prepared and cured at ambient or elevated temperature using 1 in.×4 in.×0.063 in. cold-rolled steel (CRS) Q-Panel® test substrates (Q-Lab Corp.) as supplied. The polyester-epoxide polymer composition (100 g) is stirred in an open cup for 30 seconds. After about 1 minute, the reacting liquid material is dabbed onto a one-inch section at the end of one of the CRS test coupons. A second test coupon is placed on top of the first coupon to form a 1-in$^2$ overlap section sandwiching the reacting liquid adhesive. A binder clip is affixed across the overlap area, and excess adhesive is removed. The assembly cures at ambient conditions on a flat surface for at least 5 days prior to lap shear strength testing. Additional samples are prepared similarly using untreated QPanel® aluminum coupons (Q-Lab Corp.).

Lap shear strength is measured using an Instron universal testing machine (MTS ReNew™ system) and TestWorks® 4.11 software. The binder clip is removed and the non-adhered ends of the metal coupon strips are secured in Instron 30 kN metal test grips (model #2716-015) affixed to the testing apparatus. The assembly is then pulled in the tensile direction at 0.05 in/min until overlap bond failure occurs. The peak stress at failure is measured in duplicate and averaged for each polyester-epoxide polymer system.

Results:

Table 1 shows PEEP compositions prepared using an elevated temperature process from various commercial and lab-produced polyester polyols and several EPON® resins. The table also shows properties of cast elastomers and two-component bake coatings produced using the PEEP compositions.

Compared with a typical epoxy system, the PEEP compositions shown in Table 1 are relatively soft elastomers (Shore A hardness 80-92) that have lower $T_g$ (<50° C.), high modulus, high total energy absorption, and much greater ultimate elongation (75-94%). The 2K bake coatings from these PEEP compositions show good Taber abrasion and adhesion, although the compositions produced at 100 index exhibit lower impact properties than would be expected from a typical epoxy coating. It is apparent from Example 2, however, that raising the epoxy/OH index effectively improves impact resistance. Example 7 illustrates that a chain extender, in this case 1,4-butanediol, can be included successfully in the formulation. It is apparent from the wide range of properties seen in these screening examples that opportunities abound to fine tune the formulations to achieve desired properties.

Table 2 shows PEEP compositions prepared in a low-temperature process from two commercial aromatic polyester polyols (STEPANPOL® PS-3021 and STEPANPOL® PS-3524) and an epoxidized hydrogenated bisphenol A (EPALLOY® 5000). The table also provides properties of ambient-cure cast elastomers produced using these PEEP compositions. A boron trifluoride-based catalyst (LEECURE® B-1310) is used. Overall, it is apparent that epoxy/OH indices greater than 130 provide the better elastomers. Compared with a typical epoxy system, these PEEP elastomers have relatively high total energy absorption values and much higher ultimate elongations. The modulus values depend upon epoxide/OH index.

Table 3 shows PEEP compositions prepared in a low-temperature process from polyester polyol mixtures. The mixtures include an aromatic polyester polyol (STEPANPOL® PS-3021) and an aliphatic polyester polyol (STEPANPOL® PC-1040-55). The polyol blends are reacted with an epoxidized hydrogenated bisphenol A (EPALLOY® 5000 or EPALLOY® 5001). A boron trifluoride-based catalyst (LEECURE® B-1310) is used. The table also shows properties of ambient-cure cast elastomers and coatings produced using these PEEP compositions. The elastomers are formulated at a relatively high epoxy/OH index (160-329). Overall, the elastomers have reasonable tensile properties, and compared with typical epoxy systems, higher total energy absorption and higher ultimate elongation. The coatings demonstrate good abrasion resistance, adhesion, and impact resistance when compared with epoxy systems.

Table 4 shows PEEP compositions prepared at moderate epoxy/OH index (124-161) from aromatic polyester polyols (hydroxyl number 240 mg KOH/g). The products are made at room temperature using a boron trifluoride-based catalyst and EPALLOY® 5000 or EPON® 828 and are post-cured at room temperature. Overall, the elastomers have reasonable hardness, tensile strength, and modulus. Compared with typical epoxy systems, these materials have much higher total energy absorption and higher ultimate elongation. Adhesives with lap shear strengths on cold-rolled steel (CRS) greater than 1000 psi are observed.

Table 5 illustrates PEEP compositions produced and cured at room temperature at moderate-to-high epoxy to OH index using aliphatic polyester polyols. Elongations are lower but still much higher than the <10% value that is typical for an epoxy system. Products with a wide range of hardness, tensile strength, and stiffness can be produced. The adhesives generally exhibit CRS lap shear strengths exceeding 1000 psi. Coatings with good impact resistance and fair abrasion resistance can also be made.

Table 6 illustrates the effect of epoxy/OH index in a system formulated using a single aromatic polyester polyol (based on phthalic anhydride and 1,6-hexanediol) and EPON® 828 resin. At high index (200-300), products with high stiffness and tensile strength are the norm, while at lower index (<200), softer elastomers having good energy absorption, coatings having good impact resistance, and adhesives with good lap shear strength can be made. The wide range of properties shown in Table 6 and available from one polyester polyol and one epoxy reactant demonstrates the versatility of PEEP compositions.

Tables 7 and 8 illustrate the effect of glass-transition temperature on PEEP properties. In Examples 40-43 in Table 7, the $T_g$ values are above room temperature (30° C. to 56° C.), and the elastomers generally exhibit high hardness, tensile strength, and modulus at relatively low elongation. In Examples 44-47 of Table 7, the $T_g$ values are below room temperature (1.1° C. to 17° C.), and the products have reduced stiffness with greater elongation. Additionally, the lower $T_g$ materials appear to provide improved adhesive properties. Table 8 demonstrates that PEEP compositions having $T_g$ values well below 0° C. can also be made, particularly from aliphatic polyester polyols, which generally provides softer materials.

Table 9 shows a series of products made from PEEP compositions derived from aromatic polyester polyols and having relatively high $T_g$ (37° C. to 51° C.). The table demonstrates that ultimate properties can be influenced by curing and post-cure conditions. Elevated temperatures during cure and/or post-cure can be used to boost the adhesive strength of the PEEP compositions.

The preceding examples are meant only as illustrations; the following claims define the inventive subject matter.

TABLE 1

Coatings and Cast Elastomers from Polyester-Epoxide Polymers: Elevated-Temperature Process

| Example | 1 | 2 | 3 | 4 | 5 | 6 | 7 |
|---|---|---|---|---|---|---|---|
| PEEP Composition | | | | | | | |
| Polyol[1] | PS-2402 | PC 1040-55, IPA-DEG polyol (1:1 blend) | IPA-DEG polyol | TPA-DEG polyol | PS-2402 | PS-2402 | PS-2402 + BDO (94:6) |
| Polyol components[2] | PA/DEG | IPA/AA/DEG/EG/BDO | IPA/DEG | TPA/DEG | PA/DEG | PA/DEG | PA/DEG/BDO |
| OH value (mg KOH/g) | 234 | 146 | 236 | 235 | 234 | 234 | 294 |
| Polyol OH functionality | 2.0 | 2.0 | 2.0 | 2.0 | 2.0 | 2.0 | 2.0 |
| Epoxy compound[3] | EPON® 828 | EPON® 828 | EPON® 828 | EPON® 828 | EPON® 830 | EPON® 826 | EPON® 828 |
| Epoxy/polyester (wt/wt) | 44.5/55.5 | 47.4/52.6 | 44.7/55.3 | 44.6/55.4 | 44.5/55.5 | 50.0/50.0 | 50.2/49.8 |
| Epoxy/OH index | 100 | 180 | 100 | 100 | 100 | 100 | 100 |
| Cast elastomer properties | | | | | | | |
| Shore A hardness | 88 | 81 | 84 | 86 | 85 | 80 | 92 |
| Tensile strength (psi) | 1670 | 859 | 1220 | 1050 | 797 | 2080 | 2070 |
| Modulus (psi) | 24,500 | 3190 | 44,400 | 35,100 | 14,900 | 60,100 | 37,000 |
| Elongation at break (%) | 94 | 91 | 75 | 84 | 75 | 58 | 89 |
| Total energy absorbed (lb · in./in.$^2$) | 94 | 32 | 58 | 77 | 46 | 111 | 134 |
| $T_g$ (° C.) | 2.1 | −1.7 | 6.1 | 5.5 | −1.9 | 11.0 | 1.3 |
| Coating properties | | | | | | | |
| Taber abr., mg (H-18, 1000) | 95 | 90 | 74 | 81 | 124 | 125 | 141 |
| Cross-hatch adhesion, steel | 5B | 5B | 5B | 5B | 5B | 5B | 5B |
| Direct impact, steel (lb.) | >160 | >160 | 90 | 120 | 80 | 115 | 140 |
| Indirect impact, steel (lb.) | 140 | >160 | 100 | 110 | 55 | 130 | 130 |

[1]STEPANPOL® PS-2402 and STEPANPOL® PC 1040-55 are products of Stepan Company.
[2]PA = phthalic anhydride; DEG = diethylene glycol; IPA = isophthalic acid; TPA = terephthalic acid; EG = ethylene glycol; AA = adipic acid; BDO = 1,4-butanediol.
[3]EPON® 828, EPON® 830, and EPON® 826 are products of Hexion Specialty Chemicals. In each of Exs. 1-7, 3.0 g of DMP-30 catalyst (2,4,6-tris(dimethylaminomethyl)phenol) is used.

TABLE 2

Cast Elastomers from Polyester-Epoxide Polymers: Aromatic Polyesters, Low-Temperature Process

| Example | 8 | 9 | 10 | 11 | 12 | 13 | 14 |
|---|---|---|---|---|---|---|---|
| PEEP Composition | | | | | | | |
| STEPANPOL® polyol[1] | PS-3021 | PS-3524 | PS-3524 | PS-3021 | PS-3021 | PS-3021 | PS-3021 |
| Polyol amount (g) | 43.2 | 39.7 | 32.9 | 32.9 | 36.3 | 28.2 | 30.6 |

TABLE 2-continued

Cast Elastomers from Polyester-Epoxide Polymers: Aromatic Polyesters, Low-Temperature Process

| Example | 8 | 9 | 10 | 11 | 12 | 13 | 14 |
|---|---|---|---|---|---|---|---|
| OH value (mg KOH/g) | 300 | 350 | 350 | 300 | 300 | 300 | 300 |
| Polyol OH functionality | 2.1 | 2.4 | 2.4 | 2.1 | 2.1 | 2.1 | 2.1 |
| EPALLOY ® 5000[2] (g) | 50.9 | 54.3 | 61.1 | 61.1 | 57.7 | 65.8 | 63.4 |
| LEECURE ® B-1310[3] (g) | 6.0 | 6.0 | 6.0 | 6.0 | 6.0 | 6.0 | 6.0 |
| Epoxy/OH index | 100 | 100 | 135 | 158 | 135 | 198 | 176 |
| Cast elastomer properties | | | | | | | |
| Tensile strength (psi) | 103 | 108 | 766 | 668 | 250 | 2770 | 1460 |
| Modulus (psi) | 66 | 148 | 8330 | 920 | 295 | 85,700 | 59,600 |
| Elongation at break (%) | 266 | 156 | 144 | 152 | 136 | 25 | 90 |
| Total energy absorbed (lb · in./in.$^2$) | 10.9 | 8.0 | 61.4 | 49.2 | 16.7 | 54.4 | 103 |
| $T_g$ (° C.) | −4.3 | 0.2 | 12 | 13 | 12 | 24 | 21 |

[1]STEPANPOL ® PS-3021 and STEPANPOL ® PS-3524 (aromatic polyester polyols) are products of Stepan Company.
[2]EPALLOY ® 5000 is epoxidized hydrogenated bisphenol A, a product of CVC Thermoset Specialties
[3]LEECURE ® B-1310 is a boron trifluoride-based catalyst, product of Leepoxy Plastics, Inc.

TABLE 3

Coatings and Cast Elastomers from Polyester-Epoxide Polymers: Aromatic/Aliphatic Polyester Blends, Low-Temperature Process

| Example | 15 | 16 | 17 | 18 | 19 | 20 | 21 |
|---|---|---|---|---|---|---|---|
| PEEP Composition | | | | | | | |
| STEPANPOL ® PS-3021[1] (g) | 18.4 | 19.2 | 16.5 | 17.6 | 10.6 | 9.4 | 28.2 |
| STEPANPOL ® PC-1040-55[1] (g) | 18.4 | 19.2 | 16.5 | 17.6 | 31.7 | 28.2 | 9.4 |
| Blend OH value (mg KOH/g) | 178 | 178 | 178 | 178 | 117 | 117 | 239 |
| Blend OH functionality | 2.05 | 2.05 | 2.05 | 2.05 | 2.03 | 2.03 | 2.08 |
| EPALLOY ® 5000[2] (g) | 55.2 | — | 61.1 | 58.8 | 51.7 | 56.4 | 56.4 |
| EPALLOY ® 5001[2] (g) | — | 57.6 | — | — | — | — | — |
| LEECURE ® B-1310[3] (g) | 8.0 | 4.0 | 6.0 | 6.0 | 6.0 | 6.0 | 6.0 |
| Epoxy/OH index | 216 | 237 | 267 | 240 | 268 | 329 | 160 |
| Cast elastomer properties | | | | | | | |
| Tensile strength (psi) | 439 | 425 | 1040 | 811 | 377 | 893 | 231 |
| Modulus (psi) | 654 | 1550 | 22,500 | 7720 | 1030 | 10,000 | 444 |
| Elongation at break (%) | 104 | 51 | 53 | 81 | 75 | 62 | 92 |
| Total energy absorbed (lb · in./in.$^2$) | 19.1 | 10.1 | 42.6 | 41.3 | 13.9 | 34.2 | 11.3 |
| $T_g$ (° C.) | 5.5 | 1.4 | 21 | 17 | 10 | 11 | 8.6 |
| Coating properties | | | | | | | |
| Taber abr., mg (CS-17, 1000) | 133 | — | 50 | 59 | 56 | 79 | 34 |
| Taber abr., mg (H-18, 1000) | 54 | — | 21 | 67 | 73 | 46 | 78 |
| Cross-hatch adhesion, steel | 5B | — | 5B | 5B | 5B | 5B | 5B |
| Direct impact, steel (lb.) | 70 | — | >160 | 100 | 30 | 30 | 160 |
| Indirect impact, steel (lb.) | 160 | — | >160 | 145 | >160 | >160 | >160 |

[1]STEPANPOL ® PS-3021 (aromatic polyester polyol) and STEPANPOL ® PC 1040-55 (aliphatic polyester polyol) are products of Stepan Company.
[2]EPALLOY ® 5000 is epoxidized hydrogenated bisphenol A; EPALLOY ® 5001 is an accelerated epoxidized hydrogenated bisphenol A; both are products of CVC Thermoset Specialties;
[3]LEECURE ® B-1310 is a boron trifluoride-based catalyst, product of Leepoxy Plastics, Inc.

TABLE 4

Products from Polyester-Epoxide Polymers: Aromatic Polyester Polyols, Low-Temperature Process

| Example | 22 | 23 | 24 | 25 | 26 | 27 | 28 |
|---|---|---|---|---|---|---|---|
| PEEP composition | | | | | | | |
| Polyol[1] | PC-1028-240 | IPA-DEG | IPA-HDO-240 | TPA-DEG | PS-2402 | IPA-DEG | TPA-DEG |
| Components[2] | PA, HDO | IPA, DEG | IPA, HDO | TPA, DEG | PA, DEG | IPA, DEG | TPA, DEG |
| OH val. (mg KOH/g) | 240 | 240 | 240 | 240 | 240 | 240 | 240 |
| Epoxy compound[3] | EPALLOY ® 8240 | EPALLOY ® 8240 | EPALLOY ® 8240 | EPALLOY ® 8240 | EPALLOY ® 8240 | EPON ® 828 | EPON ® 828 |
| Epoxy/OH index | 161 | 142 | 138 | 142 | 142 | 124 | 124 |
| LEECURE B-610[4] (%) | 3.3 | 2.0 | 3.3 | 2.0 | 2.2 | 1.8 | 2.0 |

TABLE 4-continued

Products from Polyester-Epoxide Polymers: Aromatic Polyester Polyols, Low-Temperature Process

| Example | 22 | 23 | 24 | 25 | 26 | 27 | 28 |
|---|---|---|---|---|---|---|---|
| Cast elastomers | | | | | | | |
| Shore A hardness | 87 | 94 | 93 | 94 | 93 | 94 | 96 |
| Tensile str. (psi) | 612 | 1700 | 1160 | 1420 | 1030 | 1700 | 2560 |
| Modulus (psi) | 876 | 44,000 | 4590 | 42,600 | 19,300 | 65,300 | 85,900 |
| Elong. at break (%) | 110 | 152 | 139 | 139 | 134 | 171 | 94 |
| TEA[5] (lb · in./in.$^2$) | 46 | 250 | 134 | 182 | 116 | 307 | 206 |
| $T_g$ (° C.) | 13 | 19 | 17 | 22 | 17 | 20 | 23 |
| Adhesives | | | | | | | |
| CRS lap shear (psi) | 1110 | 977 | 1460 | 706 | — | 499 | 233 |

[1]STEPANPOL ® PC-1028-240, STEPANPOL ® PS-2402 are aromatic polyester polyols, products of Stepan Company.
[2]DEG = diethylene glycol; HDO = 1,6-hexanediol; IPA = isophthalic acid; PA = phthalic anhydride; TPA = terephthalic acid.
[3]EPALLOY 8240, product of CVC Thermoset Specialties; EPON ® 828, product of Hexion Specialty Chemicals.
[4]LEECURE B-610, boron trifluoride-based catalyst, product of Leepoxy Plastics, Inc.
[5]Total energy absorbed.

TABLE 5

Products from Polyester-Epoxide Polymers: Aliphatic Polyester Polyols, Low-Temperature Process

| Example | 29 | 30 | 31 | 32 | 33 | 34 |
|---|---|---|---|---|---|---|
| PEEP composition | | | | | | |
| Polyol[1] | PC-102-210 | PC-105-110 | PC-102-110 | PC-5080-110 | PC-102-110 | PC-102-110/ PS-2402 (9:1) |
| Components[2] | AA, BDO | AA, HDO | AA, BDO | proprietary, high functionality | AA, BDO | AA, BDO + PA, DEG |
| OH val. (mg KOH/g) | 210 | 110 | 110 | 110 | 110 | 110, 234 |
| Epoxy compound[3] | EPON ® 828 | EPALLOY ® 5000 | EPALLOY ® 8240 | EPON ® 828 | 1:1 EPON ® 828/EPALLOY ® 5000 | EPALLOY ® 5000 |
| Epoxy/OH index | 139 | 232 | 314 | 260 | 257 | 213 |
| LEECURE B-610[4] (%) | 5.0 | 1.0 | 2.6 | 0.5 | 2.2 | 2.0 |
| Cast elastomers | | | | | | |
| Shore A hardness | 61 | 94 | 84 | 93 | 83 | 83 |
| Tensile str. (psi) | 195 | 1510 | 471 | 2410 | 487 | 731 |
| Modulus (psi) | 451 | 23,500 | 2060 | 49,800 | 2410 | 7310 |
| Elong. at break (%) | 57 | 38 | 31 | 47 | 32 | 36 |
| TEA[5] (lb · in./in.$^2$) | 6.9 | 53 | 9.2 | 127 | 10 | 23 |
| $T_g$ (° C.) | −18 | 0.8 | −9.0 | 23 | −19 | — |
| Adhesives | | | | | | |
| CRS lap shear (psi) | 1200 | 1190 | 1300 | 1160 | 1420 | 1170 |
| Coatings | | | | | | |
| D/I impact (lb./in.) | >160, >160 | >160, 80 | >160, 70 | — | 120, 20 | 20, 60 |
| Taber abrasion[6], mg | 103 | 183 | 80 | — | 221 | >200 |

[1]STEPANPOL ® PC-102-110, STEPANPOL ® PC-102-210, STEPANPOL ® PC-105-110, STEPANPOL ® PC-5080-110 are aliphatic polyester polyols; STEPANPOL ® PS-2402L is an aromatic polyester polyol, products of Stepan Company.
[2]DEG = diethylene glycol; BDO = 1,4-butanediol; HDO = 1,6-hexanediol; PA = phthalic anhydride; AA = adipic acid.
[3]EPALLOY ® 5000 and EPALLOY ® 8240, products of CVC Thermoset Specialties; EPON ® 828, product of Hexion Specialty Chemicals.
[4]LEECURE B-610, boron trifluoride-based catalyst, product of Leepoxy Plastics, Inc.
[5]Total energy absorbed.
[6]CS-17, 1000 cycles, 1-kg load.

TABLE 6

Products from Polyester-Epoxide Polymers: Aromatic Polyester Polyol, Low-Temperature Process. Effect of Epoxy/OH Index

| | Example | | | | |
|---|---|---|---|---|---|
| | 35 | 36 | 37 | 38 | 39 |
| PEEP composition | | | | | |
| Polyol[1] | PC-1028-210 | PC-1028-210 | PC-1028-210 | PC-1028-210 | PC-1028-210 |
| Components[2] | PA, HDO | PA, HDO | PA, HDO | PA, HDO | PA, HDO |
| OH val. (mg KOH/g) | 210 | 210 | 210 | 210 | 210 |

TABLE 6-continued

Products from Polyester-Epoxide Polymers:
Aromatic Polyester Polyol, Low-Temperature Process. Effect of Epoxy/OH Index

|  | Example | | | | |
|---|---|---|---|---|---|
|  | 35 | 36 | 37 | 38 | 39 |
| Epoxy compound[3] | EPON ® 828 | EPON ® 828 | EPON ® 828 | EPON ® 828 | EPON ® 828 |
| Epoxy/OH index | 300 | 250 | 200 | 150 | 134 |
| LEECURE B-610[4] (%) | 2.0 | 2.3 | 2.8 | 3.2 | 3.4 |
| Cast elastomers |  |  |  |  |  |
| Shore A hardness | 96 | 97 | 96 | 95 | 95 |
| Tensile str. (psi) | 8510 | 8450 | 8160 | 2470 | 1490 |
| Modulus (psi) | 170,000 | 156,000 | 160,000 | 71,500 | 21,100 |
| Elong. at break (%) | 7.2 | 7.5 | 7.3 | 68 | 148 |
| TEA[5] (lb · in./in.$^2$) | 37 | 41 | 38 | 163 | 169 |
| $T_g$ (° C.) | 35, 64 | 44, 58 | 37 | 24 | 17 |
| Adhesives |  |  |  |  |  |
| CRS lap shear (psi) | 1070 | 1060 | 1190 | 1980 | 1270 |
| Coatings |  |  |  |  |  |
| D/I impact (lb./in.) | — | 70, 70 | 160, 160 | 150, 110 | 160, 90 |
| Taber abrasion[6], mg | — | 73 | 58 | 33 | — |

[1]STEPANPOL ® PC-1028-210: aromatic polyester polyol, product of Stepan Company.
[2]HDO = 1,6-hexanediol; PA = phthalic anhydride.
[3]EPON ® 828, product of Hexion Specialty Chemicals.
[4]LEECURE B-610, boron trifluoride-based catalyst, product of Leepoxy Plastics, Inc.
[5]Total energy absorbed.
[6]CS-17, 1000 cycles, 1-kg load.

TABLE 7

Products from Polyester-Epoxide Polymers: Low-Temperature Process. $T_g > 0°$ C.

| Example | 40 | 41 | 42 | 43 | 44 | 45 | 46 | 47 |
|---|---|---|---|---|---|---|---|---|
| PEEP composition |  |  |  |  |  |  |  |  |
| Aliphatic polyester polyol[1] |  |  | PC-102-210 (AA, BDO) | PC-102-210 (AA, BDO) | PolyTHF 1000 | PC-102-210 (AA, BDO) | AA-58 | PC-105-110 (AA, HDO) |
| Aromatic polyester polyol[2] | IPA-HDO-315 | IPA-HDO-115 | IPA-HDO-115 | IPA-HDO-315 | IPA-HDO-315 | IPA-HDO-115 | IPA-HDO-115 | IPA-HDO-115 |
| OH val. (mg KOH/g) | 315 | 115 | 210, 115 | 210, 315 | 112, 315 | 210, 115 | 58, 115 | 110, 115 |
| Epoxy compound[3] | EPON ® 828 | EPALLOY ® 8240 | EPALLOY ® 8240 | EPON ® 828 | EPON ® 828 | EPALLOY ® 8240 | EPALLOY ® 8240 | EPALLOY ® 8240 |
| Epoxy/OH index | 200 | 300 | 300 | 200 | 200 | 200 | 300 | 200 |
| Epoxy/polyol (wt./wt.) | 69/31 | 53/47 | 61/39 | 65/35 | 62/38 | 51/49 | 47/53 | 43/57 |
| BF$_3$/polyol cat.[4] (%) | 1.5 | 1.5 | 2.0 | 2.0 | 4.0 | 2.0 | 1.5 | 2.5 |
| Cast elastomers |  |  |  |  |  |  |  |  |
| Shore A hardness | 84 | 97 | 98 | 94 | 95 | 93 | 95 | 83 |
| Tensile str. (psi) | 6910 | 6010 | 5860 | 5300 | 1670 | 910 | 1200 | 455 |
| Modulus (psi) | 13,100 | 117,000 | 122,000 | 128,000 | 9170 | 2300 | 6780 | 1210 |
| Elong. at break (%) | 13 | 9.5 | 8.0 | 7.4 | 86 | 77 | 59 | 62 |
| TEA[5] (lb · in./in.$^2$) | 64 | 53 | 33 | 25 | 90 | 41 | 47 | 19 |
| $T_g$ (° C.) | 56 | 42 | 34 | 30 | 17 | 10 | 5.5 | 1.1 |
| Adhesives |  |  |  |  |  |  |  |  |
| CRS lap shear (psi) | 1270 | 1340 | 860 | 1190 | 1760 | 1230 | 1220 | 1800 |
| Al lap shear (psi) | 906 | 976 | 900 | 977 | 1400 | 1050 | 1050 | 1780 |

[1]STEPANPOL ® PC-102-210, STEPANPOL ® PC-105-210, STEPANPOL ® AA-58 are aliphatic polyester polyols, products of Stepan Company. PolyTHF 1000 is a polytetrahydrofuran, product of BASF.
[2]BDO = 1,4-butanediol; HDO = 1,6-hexanediol; IPA = isophthalic acid; AA = adipic acid.
[3]EPALLOY 8240, product of CVC Thermoset Specialties; EPON ® 828, product of Hexion Specialty Chemicals.
[4]Polyol/boron trifluoride-based catalyst.
[5]Total energy absorbed. Blends are 1:1 by wt. of aliphatic and aromatic polyester polyols.

TABLE 8

Products from Polyester-Epoxide Polymers: Low-Temperature Process. $T_g < 0°$ C.

| Example | 48 | 49 | 50 | 51 | 52 | 53 |
|---|---|---|---|---|---|---|
| PEEP composition | | | | | | |
| Aliphatic polyester polyol[1] | PC-105-110 (AA, HDO) | PC-105-110 (AA, HDO) | AA-58 | AA-58 | AA-58 | AA-58 |
| Aromatic polyester polyol[2] | IPA-HDO-315 | IPA-HDO-115 | IPA-HDO-315 | none | none | none |
| OH val. (mg KOH/g) | 110, 315 | 110, 115 | 58, 315 | 58 | 58 | 58 |
| Epoxy compound[3] | EPON ® 828 | EPALLOY ® 8240 | EPON ® 828 | EPON ® 828 | EPALLOY ® 8240 | EPALLOY ® 8240 |
| Epoxy/OH index | 125 | 125 | 125 | 300 | 300 | 125 |
| Epoxy/polyol (wt./wt.) | 48/52 | 32/68 | 45/55 | 40/60 | 37/63 | 21/79 |
| $BF_3$/polyol cat.[4] (%) | 2.5 | 2.5 | 2.5 | 2.0 | 1.5 | 3.5 |
| Cast elastomers | | | | | | |
| Shore A hardness | 66 | 87 | 63 | 80 | 78 | 22 |
| Tensile str. (psi) | 246 | 500 | 209 | 170 | 161 | 21 |
| Modulus (psi) | 345 | 6380 | 315 | 913 | 847 | 54 |
| Elong. at break (%) | 113 | 79 | 98 | 20 | 21 | 38 |
| TEA[5] (lb · in./in.$^2$) | 19 | 36 | 13 | 2.0 | 2.5 | 0.7 |
| $T_g$ (° C.) | −3.2 | −3.8 | −8.3 | −20 | −24 | −37 |
| Adhesives | | | | | | |
| CRS lap shear (psi) | 1800 | 944 | 389 | 306 | 203 | 111 |
| Al lap shear (psi) | 875 | 1030 | 205 | 164 | 143 | 52 |

[1]STEPANPOL ® PC-105-110 and STEPANPOL ® AA-58 are aliphatic polyester polyols, products of Stepan Company.
[2]HDO = 1,6-hexanediol; IPA = isophthalic acid; AA = adipic acid.
[3]EPALLOY 8240, product of CVC Thermoset Specialties; EPON ® 828, product of Hexion Specialty Chemicals.
[4]Polyol/boron trifluoride-based catalyst.
[5]Total energy absorbed.

TABLE 9

Adhesive Products from Polyester-Epoxide Polymers: Effect of Curing Conditions on Lap Shear Strength

| | Example | | | |
|---|---|---|---|---|
| | 54 | 55 | 56 | 57 |
| PEEP composition | | | | |
| Aromatic polyester polyol[1,2] | PC-1028-210 (PA, HDO) | IPA-HDO-115 | IPA-HDO-240 | IPA-HDO-315 |
| OH val. (mg KOH/g) | 210 | 115 | 240 | 315 |
| Epoxy compound[3] | EPALLOY ® 8240 | EPALLOY ® 8240 | EPON ® 828 | EPON ® 828 |
| Epoxy-OH index | 300 | 300 | 200 | 200 |
| Epoxy/polyol (wt./wt.) | 66.8/31.7 | 52.3/46.7 | 61.8/36.2 | 67.8/30.7 |
| $BF_3$/polyol cat.[4] (%) | 1.5 | 1.0 | 2.0 | 1.5 |
| $T_g$ (° C.) | 51 | 37 | 46 | 51 |
| Working time (s) | 210 | 180 | 180 | 195 |
| Adhesives | Cold-rolled steel (CRS) lap shear strength (psi) | | | |
| RT cure; RT post | 1310 | 2030 | 1510 | 1230 |
| 0.5 h, 100° C. cure; RT post | 1950 | 2670 | 1860 | 1920 |
| RT cure; 0.5 h, 170° C. post | 2210 | 2950 | 2190 | 2090 |
| 0.5 h, 100° C. cure; 0.5 h, 170° C. post | 2660 | 2300 | 2410 | 2040 |
| 0.5 h, 100° C. cure; 0.5 h, 170° C. and 0.5 h, 200° C. post | 3340 | 3520 | 2800 | 2310 |

[1]STEPANPOL ® PC-1028-210, aromatic polyester polyol, product of Stepan Company.
[2]HDO = 1,6-hexanediol; IPA = isophthalic acid; PA = phthalic anhydride.
[3]EPALLOY 8240, product of CVC Thermoset Specialties; EPON ® 828, product of Hexion Specialty Chemicals.
[4]Polyol/boron trifluoride-based catalyst.

We claim:

1. A polyester-epoxide polymer composition which comprises a reaction product of:
    (a) a polyepoxide compound having an equivalent weight within the range of 125 to 250 g/equiv; and
    (b) a polyol composition comprising a polyester polyol, wherein the polyester polyol has a hydroxyl value within the range of 50 to 400 mg KOH/g, an average hydroxyl functionality within the range of 1.5 to 4.0, and an acid number less than 5 mg KOH/g;
    wherein the ratio of epoxy equivalents of the polyepoxide compound to hydroxyl equivalents of the polyol composition is within the range of 0.8 to 3.5, and the polyester-epoxide polymer composition has a glass-transition temperature as measured by differential scanning calorimetry within the range of −40° C. to 60° C.

2. The polyester-epoxide polymer composition of claim 1 wherein the polyepoxide compound is an aromatic polyepoxide.

3. The polyester-epoxide polymer composition of claim 2 wherein the aromatic polyepoxide is a reaction product of a bisphenol and epichlorohydrin having an equivalent weight within the range of 185 to 200 g/equiv.

4. The polyester-epoxide polymer composition of claim 1 wherein the polyepoxide compound is an aliphatic or cycloaliphatic polyepoxide.

5. The polyester-epoxide polymer composition of claim 1 wherein the polyol composition comprises an aromatic polyester polyol or an aromatic polyester polyol in combination with an aliphatic polyester polyol.

6. The polyester-epoxide polymer composition of claim 1 wherein the polyol composition comprises an aliphatic polyester polyol.

7. The polyester-epoxide polymer composition of claim 1 wherein the polyester polyol has a hydroxyl value within the range of 60 to 350 mg KOH/g and an average hydroxyl functionality within the range of 1.8 to 3.5.

8. The polyester-epoxide polymer composition of claim 1 having a glass-transition temperature within the range of −30° C. to 35° C.

9. The polyester-epoxide polymer composition of claim 1 having a glass-transition temperature within the range of −5° C. to 25° C.

10. The polyester-epoxide polymer composition of claim 1 having an elongation at break by ASTM D412, Method A of at least 30%.

11. The polyester-epoxide polymer composition of claim 1 having an elongation at break by ASTM D412, Method A of at least 80%.

12. A coating comprising the polyester-epoxide polymer composition of claim 1.

13. An elastomer or a microcellular elastomer comprising the polyester-epoxide polymer composition of claim 1.

14. An adhesive or sealant comprising the polyester-epoxide polymer composition of claim 1.

15. A process which comprises heating, at a temperature within the range of 50° C. to 100° C., a mixture comprising a polyepoxide compound having an equivalent weight within the range of 125 to 250 g/equiv and a polyol composition comprising a polyester polyol, wherein the polyester polyol has a hydroxyl value within the range of 50 to 400 mg KOH/g, an average hydroxyl functionality within the range of 1.5 to 4.0, and an acid number less than 5 mg KOH/g, wherein the ratio of epoxy equivalents of the polyepoxide compound to hydroxyl equivalents of the polyol composition is within the range of 0.8 to 3.5, to produce a polyester-epoxide polymer composition having a glass-transition temperature as measured by differential scanning calorimetry within the range of −40° C. to 60° C.

16. The process of claim 15 wherein the polyester-epoxide polymer composition is a coating, adhesive, sealant, or elastomer.

17. The process of claim 15 wherein the heating is performed in the presence of a tertiary amine catalyst.

18. The process of claim 15 wherein the polyol composition comprises an aromatic polyester polyol or an aromatic polyester polyol in combination with an aliphatic polyester polyol.

19. The process of claim 15 wherein the polyol composition comprises an aliphatic polyester polyol.

20. The process of claim 15 wherein the polyester-epoxide polymer composition has a glass-transition temperature within the range of −30° C. to 35° C.

21. A process which comprises reacting, in the presence of a catalyst comprising a base or a Lewis acid compound, a polyepoxide compound having an equivalent weight within the range of 125 to 250 g/equiv and a polyol composition comprising a polyester polyol, wherein the polyester polyol has a hydroxyl value within the range of 50 to 400 mg KOH/g, an average hydroxyl functionality within the range of 1.5 to 4.0, and an acid number less than 5 mg KOH/g, wherein the ratio of epoxy equivalents of the polyepoxide compound to hydroxyl equivalents of the polyol composition is within the range of 0.8 to 3.5, to produce a polyester-epoxide polymer composition having a glass-transition temperature as measured by differential scanning calorimetry within the range of −40° C. to 60° C.

22. The process of claim 21 wherein the catalyst comprises a Lewis acid compound.

23. The process of claim 22 wherein the catalyst comprises a complex of boron trifluoride with an amine, an ether, an alcohol, a polyol, or a combination thereof.

24. The process of claim 21 wherein the reaction is performed at a temperature within the range of 0° C. to 45° C.

25. The process of claim 21 wherein the polyol composition comprises an aromatic polyester polyol or an aromatic polyester polyol in combination with an aliphatic polyester polyol.

26. The process of claim 21 wherein the polyol composition comprises an aliphatic polyester polyol.

27. The process of claim 21 wherein the polyester-epoxide polymer composition is a coating, adhesive, sealant, or elastomer.

28. The process of claim 21 wherein the polyepoxide compound and the polyol composition are reacted at an epoxy/hydroxyl index within the range of 100 to 350.

29. The process of claim 21 wherein the polyepoxide compound and the polyol composition are reacted at an epoxy/hydroxyl index within the range of 135 to 330.

30. The process of claim 21 wherein the polyester-epoxide polymer composition has a glass-transition temperature within the range of −30° C. to 35° C.

* * * * *